United States Patent
Malivoir

[15] 3,659,555
[45] May 2, 1972

[54] MACHINE FOR COATING CYLINDRICAL OBJECTS

[72] Inventor: Roger Marcel Malivoir, Pont-A-Mousson, France

[73] Assignee: Centre De Recherches De Pont-A-Mousson, Pont-A-Mousson, France

[22] Filed: Sept. 15, 1970

[21] Appl. No.: 72,436

[30] Foreign Application Priority Data

Oct. 2, 1969 France.................................6933671

[52] U.S. Cl.............................................................118/320
[51] Int. Cl..............................................................B09b 13/04
[58] Field of Search...............................118/320, 321, 322

[56] References Cited

UNITED STATES PATENTS

| | | | |
|---|---|---|---|
| 2,598,246 | 5/1952 | Fowler | 118/321 |
| 1,070,035 | 8/1913 | Horrell | 118/321 |
| 2,557,624 | 6/1951 | Wilmot et al. | 118/321 |

*Primary Examiner*—Henry S. Jaudon
*Attorney*—J. Delattre-Seguy

[57] ABSTRACT

A machine for externally coating a pipe. The pipe is made to rotate and travel lengthwise through a coating cabin having openings allowing the passage of the pipe. At least one coating gun extends into the cabin for coating the pipe as it moves through the cabin. A duct communicates with the interior of the cabin for discharging harmful gases and particles produced in the course of coating.

5 Claims, 8 Drawing Figures

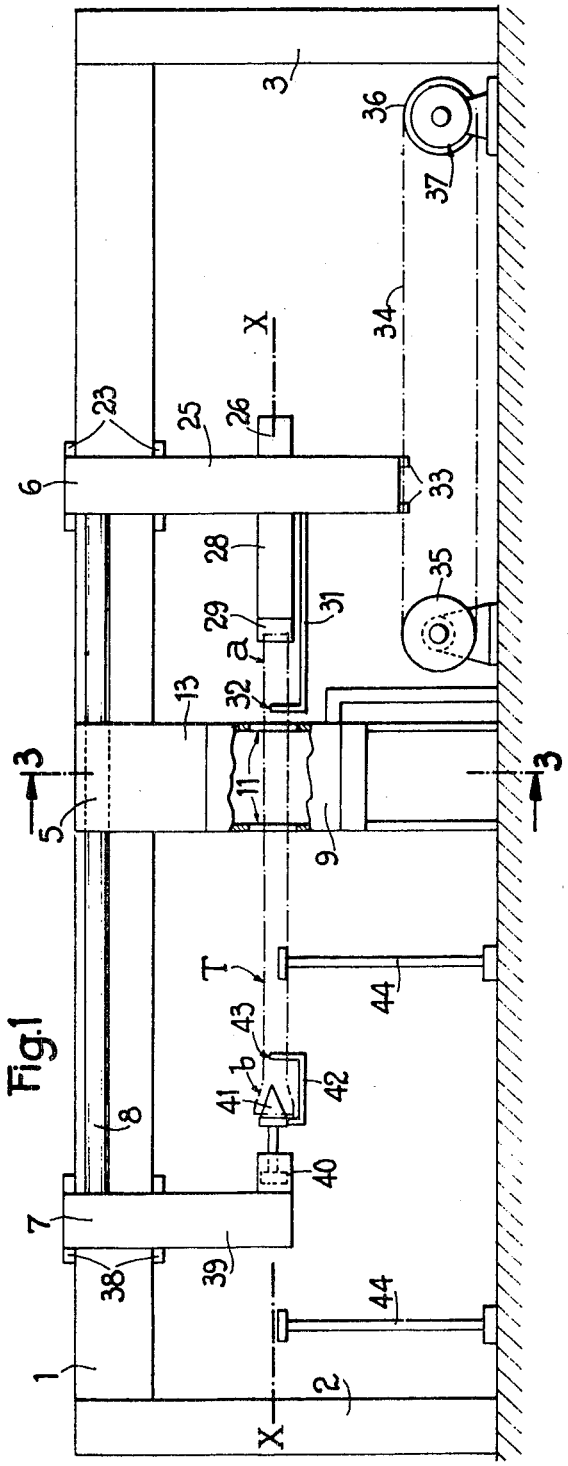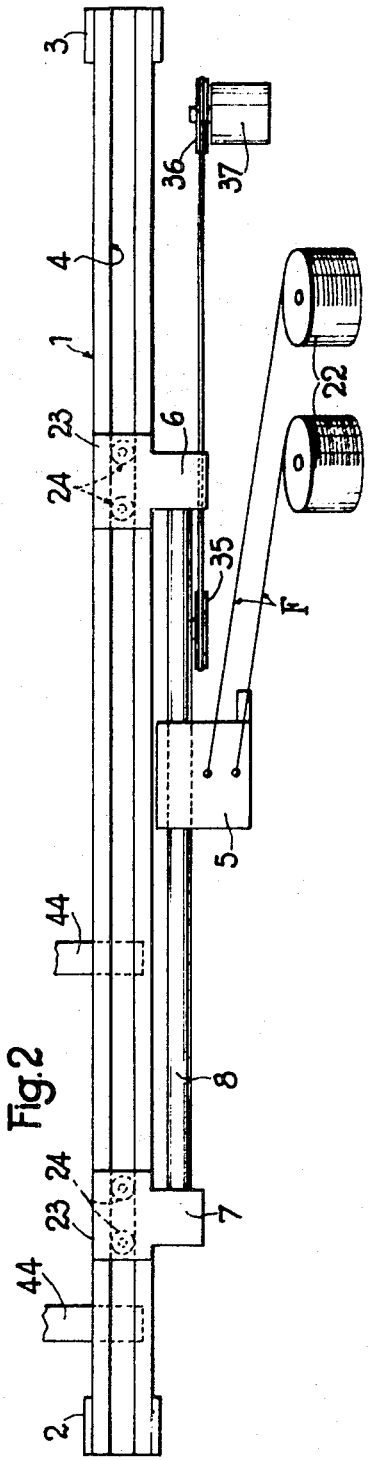

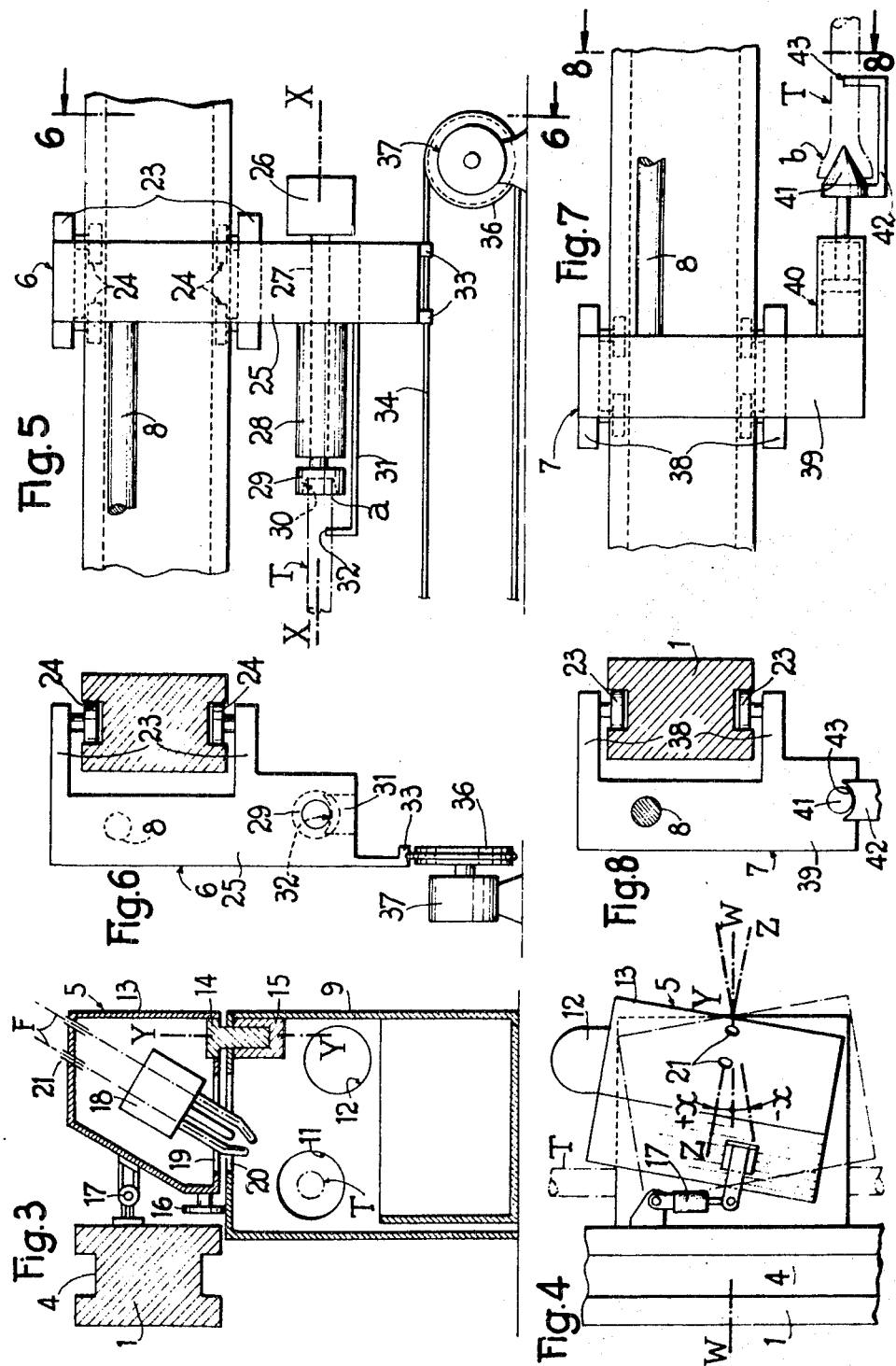

MACHINE FOR COATING CYLINDRICAL OBJECTS

The present invention relates to machines for externally coating cylindrical objects and in particular for metallizing pipes or tubes.

In machines of known type, the pipes to be coated are fed in a direction parallel to a cabin in which they are disposed entirely. In the cabin, the pipe is rotated and the means for spraying the coating product, which is usually one or several spraying guns, is moved along the rotating pipe so that it deposits this coating product on the entire outer surface of the pipe. The guns for metallic coatings spray molten metal produced by melting one or several metal wires, for example flame guns, electric arc guns. To make this machine operate in a practically continuous manner, the pipe is made to enter the cabin at one end and issue therefrom at the other.

The known machines have serious drawbacks and in particular the following:

as the whole of the pipe is placed in the cabin and the gun or guns move along the pipe, the cabins are large and therefore consume a great amount of space;

usually, when a coating is produced there is a large amount of harmful gases or particles given off (zinc dust for example is very abrasive). Now, the elimination of these harmful gases or particles is very difficult to achieve. Further, as the cabin is long and the inlet and outlet openings for the pipes are rather large since the pipes enter in a direction perpendicular to their axes, flow of the harmful gases or particles out of the cabin is facilitated;

the gun or gums are movable in translation along the pipe in the cabin and the wires supplying the coating metal must also move if the supply of metal to the gun or guns is to be continuous. For this purpose, the wires pass through sheaths integral with a chain which rotates and moves about a movable pulley, one end of the chain being fixed and the other end moving with the gun. The sheaths thus describe a curve and this results in a large amount of outer wear of the sheaths. Further, an inner wear occurs subsequent to the rubbing of the wire in the bent sheaths. This creates clogging and sometimes the blocking of the wire in the sheaths.

An object of the invention is to provide a machine for coating pipes and other cylindrical objects, this machine being of the aforementioned type but so improved as to remedy the aforementioned drawbacks.

The machine according to the invention comprises, movably mounted on a fixed beam constituting a support and guide, two carriages which are integral with each other and one of which is combined with drive means, said two carriages being disposed on each side of a narrow coating cabin and being provided with two coaxial mandrels one of which is driven in rotation, the mandrels being adapted to carry the pipe and cause it to move while rotating through the cabin when the carriages are moved along the beam.

According to another feature of the invention, the coating cabin is fixed and has a head which is integral with at least one coating gun orientable on a fixed box structure having lateral walls each of which is provided with an opening having a section of size substantially greater than that of the pipe so as to allow the latter to move through the box structure, a suction duct communicating with the box structure creating a suction inside the box structure and discharging the harmful gases and particles produced by the coating gun.

With this arrangement, it is possible to discharge all the harmful gases and particles with no possibility of the latter rendering the atmosphere in the vicinity of the cabin toxic, since the inlet and outlet apertures for the pipes of the cabin are small and it is easier to suck out gases and particles in a small cabin.

Moreover, as the coating cabin is fixed, there is no continuous movement of the sheaths through which the wires are fed and there is less wear and less danger of clogging and blocking of the wires in these sheaths.

Further features and advantages of the invention will be apparent from the ensuing description with reference to the accompanying drawings.

In the drawings:

FIG. 1 is an elevational view of a coating machine according to the invention;

FIG. 2 is a plan view of the machine;

FIG. 3 is a diagrammatic sectional view of the coating cabin taken along line 3—3 of FIG. 1 on an enlarged scale;

FIG. 4 is a plan view of the cabin;

FIG. 5 is an elevational view of the drive carriage;

FIG. 6 is an elevational view of the drive carriage taken along line 6—6 of FIG. 5;

FIG. 7 is an elevational view of the non-driving carriage, and

FIG. 8 is a sectional view taken along line 8—8 of FIG. 7.

In the embodiment shown in the drawings, the coating machine is a machine for metallizing pipes T of the type having a male end $a$ and a socket end $b$. The machine comprises:

a fixed beam or girder 1 which constitutes a support and is carried at both ends at a given height above the ground by uprights or other supports 2 and 3. This beam 1 is provided with a groove 4 on its upper and lower faces and throughout its length;

a coating cabin 5 which is supported on the ground and located adjacent the beam mid-way between the supports 2 and 3;

a drive carriage 6 and a non-driving carriage 7 are located on each side of the cabin 5 and slidably supported on the beam 1. The carriages 6 and 7 are rendered integral with each other by a rod 8.

The machine (FIGS. 3 and 4) comprises a rectangular-sided box structure 9 which bears on the ground and has in its lower part a drawer 10 also bearing on the ground. Each of two lateral walls of the box structure perpendicular to the beam 1 has a circular opening 11, the openings 11 having a common axis X—X parallel to the beam 1. These openings have a diameter exceeding the outside diameter of the pipe T to be coated. A duct 12 communicates with the interior of the box structure so as to create therein a suction and thus draw out the dust and gases created by the coating operation and conduct them to a dust-removing or purifying apparatus (not shown).

An orientable head 13 having a trapezoidal vertical section bears on the box structure 9 and is rotatable about a vertical axis Y—Y owing to the provision of a pivot 14 which is integral with the head and journalled in a thrust bearing 13 carried by the upper part of the box structure. This pivot is disposed on the side of the head 13 remote from the beam 1. Mounted on the lateral wall of the head which is parallel and adjacent the beam 1 is a roller 16 which has an axis Z—Z (FIG. 4) and bears against and rolls along the upper wall of the box structure. A fluid motor or cylinder device 17 having an axis roughly parallel to the axis X—X is connected by pivotable connections at one end to the lateral face of the beam 1 and at the other end to the lateral inclined wall of the head 13. This cylinder device, when fed with fluid under pressure, pivots the head 13 about the axis Y—Y.

A spray gun 18 is fixed inside the head. It is located in the vertical plane containing the axis Z—Z and parallel to the inclined wall of the head 13. The gun extends into the box structure 9 through apertures 19 and 20 which are respectively formed in the lower wall of the head and in the upper wall of the box structure. Apertures 21 are provided in the upper wall of the head in the extension of the gun through which pass the metal coating wires F supplied by reels 22 (FIG. 2).

A drive carriage 6 (FIGS. 1, 2, 5, 6) is suspended from the beam 1 between the cabin 5 and the support 3. It comprises a yoke having two horizontal branches 23 which extend above and below the beam 1 and carry rollers 24 which roll in the groove 4. This yoke is extended in its lower part by a portion 25 which carries an electric or hydraulic motor 26 having an axis X—X. The output shaft 27 of the motor extends through the portion 25 of the carriage and through a protecting sleeve 28 fixed to the carriage. Fixed to the shaft 27 at the end of the sleeve is a mandrel or chuck 29 provided with a tapered bore 30 on the axis X—X. The male end $a$ of the pipe T to be coated enters and is maintained in the bore 30. An L-shaped extension member 31 having a vertical portion terminating in a cradle 32 for supporting the pipe is integral with the portion 25 of the carriage. The portion 25 terminates at its lower end in hooks 33 which are clamped on an endless belt or cable 34 and render the carriage 6 integral with the cable. The latter extends around two pulleys 35, 36. The pulley 35 is driven by a motor 37.

The non-driving carriage 7 (FIGS. 7 and 8) is similarly suspended from the beam 1 between the support 2 and the cabin 5.

It comprises a yoke 38 whose horizontal branches carry rollers 23 which roll in longitudinal grooves 4. This yoke 38 is extended at its lower end by a vertical portion 39 which carries the cylinder of a fluid motor or cylinder device 40 having an axis X—X. The piston rod of the device 40 terminates in a tapered mandrel 41 having such size that it can enter and engage the socket $b$ of the pipe T. Fixed to the tapered mandrel 41 is an L-shaped hook 43 having a vertical portion terminating in a cradle 43 for supporting the pipe T.

The coating machine just described operates in the following manner:

In the operative position: the carriages 6 and 7 interconnected by the rod 8 are respectively near the cabin 5 and the support 2. The hooks 33 of the carriage 6 fixed to the endless cable 34 are adjacent the pulley 35. The piston rod of the cylinder device 40 carrying the mandrel 41 is in its position withdrawn into the cylinder 40 of the cylinder device carried by the carriage 7. With the carriage 6 adjacent or against the cabin 5, the mandrel 29 extends through the openings 11 and out of the left side of the cabin. Further, the head 13 of the cabin is in the position shown in FIG. 4 and it makes an angle of $+x$ with the plane of the cabin perpendicular to the beam, the cylinder device 17 being in its withdrawn position.

The pipe T to be coated is fed by a runway comprising two rails 44 (FIGS. 1 and 2) on which the pipe rolls, these rails being higher than the extensions or supports 31 and 42 of the carriages 6 and 7. The pipe T therefore drops onto the cradles 32 and 43 formed by the vertical portions of the extensions. At this moment the cylinder device 40 of the carriage 7 is supplied with fluid under pressure and the tapered mandrel 41 is urged inside the socket $b$ of the pipe. The travel of the cylinder device 40 is such that, at the end of the travel, the mandrel 41 urges the male end $a$ of the pipe into the tapered bore 30 of the mandrel 29 of the carriage 6.

The motor 26 carried by the carriage 6 is then started up so as to rotate the pipe, the gun spray 18 is also started up in the known manner, this gun being inclined in the same way as the head 13 at an angle $+x$ with respect to the direction W—W (FIG. 4) perpendicular to the beam. The motor 37 for shifting the carriages 6 and 7 and the pipe T is then started up. The gun 18 then sprays on the pipe a helical deposit or coating product. The speed of rotation and translation of the pipe T are so adjusted that the pitch of the helical coating is double the width of the helical strip of coating produced by the gun. When the pipe has passed in front of the gun throughout its length the carriage 6 is near the support 3. The direction of rotation of the pipe and the direction of translation of the carriage 6 are then reversed and the head 13 of the cabin 5 is oriented at an angle $-x$ by the action of the cylinder device 17 (position of the head 13 shown in dot-dash line). The axis of the gun is then offset relative to its initial position an extent equal to half the pitch of the helical coating. The pipe is returned to its position of departure and during its movement it receives another helical strip of coating having the same pitch and the same width as the first strip. When the carriage 7 arrives near the support 2, the pipe has been entirely coated and the movement in translation and the rotation of the pipe are stopped and operation of the gun stopped. The piston rod of the cylinder device 40 returns to the withdrawn position and draws along therewith the mandrel 41. The latter moves out of the socket $b$ of the pipe which slides on the cradle of the extension 42. In continuing to be withdrawn, this extension 42 moves the pipe out of the mandrel 29. The pipe is then taken up by a runway (not shown) which raises it so as to disengage it from the cradles 32 and 43 of the extensions 31 and 42.

The main advantage of this machine is that the pipe to be coated passes into a small fixed cabin 5 by way of the two small openings 11. Therefore, it is much easier to discharge out of the cabin the harmful particles and gases given off by the gun during the coating.

Another advantage of the invention resides in the fact that the gun is fixed in position so that the supply of metal wire F to this gun is facilitated. Thus there is much less danger of the wire being stuck in the sheaths.

To reduce the time of passage of the pipe in front of the gun by increasing the speed of rotation of the pipe, two guns may be placed in the cabin in offset relation to each other. The width of the coating applied in the course of a passage of the pipe is then doubled and this enables the pitch of the helix to be halved or, for a given speed of rotation, the speed of translation of the pipe to be doubled.

A modification of the invention resides in positioning two guns in the cabin offset from each other a length equal to the width of the helical strip of coating so that the coating is deposited in the form of continguous coils. In this case, the head 13 of the cabin is itself fixed in any position. The pipe-carrying carriages can then be returned without rotating the pipe.

Another possibility of the invention resides in the fact that it is possible to combine and associate two machines of the type just described so as to coat two pipes simultaneously.

Having now described my invention what I claim and desire to secure by Letters Patent is:

1. A machine for externally coating elongated objects, said machine comprising a fixed beam constituting a support and guide, support means movable along the beam and having a first support element and a second support element coaxial with the first support element for supportingly engaging opposite end portions of the object, first drive means for driving the support means along the beam in a direction parallel to the common axis of the support elements, second drive means for rotating the object about said axis, coating means for applying a coating on the object, a coating cabin substantially completely surrounding the coating means and stationary relative to the beam, means defining two opposed apertures coaxial with said axis and through which apertures the object travels for coating purposes, the extent of the cabin axially of said axis being a minor fraction of the distance between the support elements, means located outside and adjacent one end of the cabin for feeding the object transversely of said axis and placing the object in coaxial relation to said axis and in supported engagement with the support elements when the first support element is adjacent the cabin.

2. A machine as claimed in claim 1, wherein the coating means comprises a projecting gun which is pivotable between two extreme positions on each side of a plane perpendicular to said axis, means being provided for pivoting the gun to a first extreme position in one direction of movement of the supporting means relative to the cabin and to a second extreme position in the opposite direction of movement of the supporting means relative to the cabin.

3. A machine for externally coating cylindrical objects, and in particular for metallizing pipes and tubes, said machine comprising a fixed beam constituting a support and guide, two carriages which are integral with each other and movably mounted on the beam, drive means for driving one of the carriages along the beam, coating means including a narrow coating cabin in which the cylindrical object is coated, the two carriages being located on opposite sides of the cabin and each of the carriages carrying a mandrel, a drive device for rotating one of the mandrels, the mandrels being coaxial and adapted to carry the cylindrical object to be coated and to rotate the object and cause it to pass through the cabin when the carriages are moved along the beam by the drive means, said coating means being fixed relative to the beam and comprising a head, at least one coating gun integral with the head, a box structure constituting said cabin and having two lateral walls and coaxial apertures in the lateral walls having a sectional size larger than the sectional size of the cylindrical object to be coated, whereby the cylindrical object can pass through the box structure, a duct communicating with the interior of the box structure for connection to suction means for discharging from the interior of the box structure harmful gases and particles produced by the coating gun.

4. A machine as claimed in claim 3, wherein the carriages are interconnected by a rigid rod.

5. A machine as claimed in claim 3, wherein each of the mandrels is combined with an extension element having an end portion constituting a cradle for supporting the cylindrical object.

* * * * *